United States Patent [19]

Yoshihara

[11] Patent Number: 4,671,682
[45] Date of Patent: Jun. 9, 1987

[54] DIVIDED TYPE ANTIFRICTION BEARING ASSEMBLY WITH A SEAL MEMBER

[75] Inventor: Toshiro Yoshihara, Yokohama, Japan

[73] Assignee: Nippon Seiko Kabushiki Kaisha, Tokyo, Japan

[21] Appl. No.: 872,693

[22] Filed: Jun. 10, 1986

[30] Foreign Application Priority Data

Jun. 19, 1985 [JP] Japan ............................. 60-131979

[51] Int. Cl.⁴ .............................................. F16C 33/58
[52] U.S. Cl. .................................... 384/484; 384/480; 384/503; 384/570
[58] Field of Search .............. 384/484, 570, 503, 480, 384/568

[56] References Cited

U.S. PATENT DOCUMENTS

| | | | |
|---|---|---|---|
| 3,140,130 | 7/1964 | Barr | 384/570 |
| 3,166,363 | 1/1965 | Kay | |
| 3,546,762 | 12/1970 | Martin | 384/503 |
| 3,834,772 | 9/1974 | Bowen | 384/503 |
| 4,015,883 | 4/1977 | Taylor | 384/484 |
| 4,336,971 | 6/1982 | Reiter | 384/484 |

Primary Examiner—Lenard A. Footland
Attorney, Agent, or Firm—Shapiro and Shapiro

[57] ABSTRACT

A divided type antifriction bearing assembly with a seal having two semicircular divided inner annular members each having a track on the outer peripheral surface thereof and having at the axially outer end of the track a flange portion which is in contact with the end surface of a roller, the inner annular members each forming a cylindrical shape having a cylindrical portion axially extending continuously to the flange portion, the inner annular members being divided along the axis thereof and coupled together, an outer annular member having a track on the inner peripheral surface thereof opposed to the inner annular members, and rollers provided between the tracks of the inner and outer annular members is characterized in that the bearing assembly includes a seal member mounted radially inwardly outside the track of the outer annular member, the inner peripheral portion of the seal member is in sliding contact with a portion of the cylindrical portion of each of the inner annular members, and the inner annular members have, at the opposite ends thereof leaving the cylindrical portions, slits opposed to each other at symmetrical positions passing through the axis and are naturally divided with the slits as the boundary.

3 Claims, 4 Drawing Figures

DIVIDED TYPE ANTIFRICTION BEARING ASSEMBLY WITH A SEAL MEMBER

BACKGROUND OF THE INVENTION

1. Field of the Invention

This invention relates to a divided type antifriction bearing assembly in which such parts as an inner race, an outer race, a retainer and an axle box are semispherically divided into two for the assembly thereof to an axle body or the neck portion of the roll of a continuous casting apparatus, and more particularly to improvements in a divided type antifriction bearing assembly of the type in which the semispherically divided inner race is fixed to the axle body or the neck portion of the roll through fastening bolts without the use of any special fastening rings.

2. Related Background Art

The heretofore known divided type antifriction bearing assembly of this type is of a structure in which, as disclosed, for example, in U.S. Pat. No. 3,166,363, the inner race semicircularly divided into two is mechanically divided as by grinding and therefore in the fixing thereof, a gap is left between the joined surfaces or the joined surfaces deviate from each other and smooth connection thereof cannot be accomplished and accordingly, the outer peripheral surface of the cylindrical portion at the end of the inner race cannot be directly made into the sliding surface of a seal member and the sliding surface of the seal member is brought into sliding contact with the outer peripheral surface of the axle body axially remote from said inner race or with the outer peripheral surface of an annular member fitted to the axle body.

This has led to the disadvantages that the axial length of the bearing assembly is great, that where the axle body is made into a sliding surface, the abrasion of the seal member is great from the relation with the finished surface of the axle body and that where a special annular member is used, the number of required parts is great and assembly is cumbersome.

SUMMARY OF THE INVENTION

It is an object of the present invention to eliminate the above-noted problems peculiar to the inner race according to the prior art and more specifically, to prevent such disadvantages as the abrasion of the seal member, the increased number of parts and the bulkiness of the assembly.

According to the present invention, in the conventional antifriction bearing assembly as described above, the flange portion of the inner race axially extends to form a cylindrical portion of any outer diameter, the inner race is provided with slits opposed to each other at symmetrical positions passing through the axis on the opposite sides thereof leaving a sliding cylindrical portion with which the seal member is in sliding contact toward the track of said cylindrical portion and is naturally divided (forcibly broken away) with the slits as the boundary, and the inner peripheral edge of the seal member held by an outer race side member such as an outer race or an axle box is brought into contact with the outer peripheral surface of said naturally divided sliding cylindrical portion.

Thus, in the present invention, the sliding cylindrical surface positioned adjacent to the flange of the inner race with which is in contact the seal member sealing the bearing fixed to the outer race side member such as the outer race or the axle box is not divided by the slits but naturally divided and therefore, the fastening of the inner race in its state assembled to the apparatus is accomplished with the minute unevennesses of the naturally divided surfaces being completely coincident with each other and without any gap or deviation being created between the coincident surfaces.

DESCRIPTION OF THE PREFERRED EMBODIMENTS

The divided type antifriction bearing assembly with a seal member according to the present invention will hereinafter be described with respect to two typical embodiment thereof shown in FIGS. 1 to 4.

Figure 1:
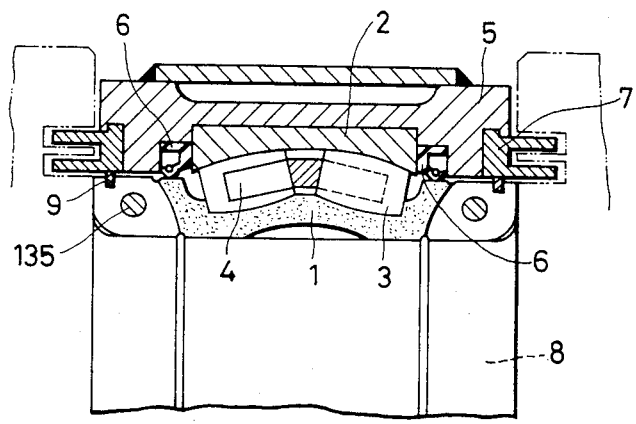
FIG. 1 is a cross-sectional view showing the essential portions of a first embodiment of the present invention.

Referring to FIG. 1 which shows a double-row spherical roller bearing mounted on the roll neck portion 8 of a continuous casting apparatus, reference numeral 1 designates an inner race, reference numeral 2 denotes an outer race, reference numeral 3 designates two rows of spherical rollers disposed between the inner race and the outer race, and reference numeral 4 denotes a retainer for retaining the spherical rollers. The outer race 2 is mounted in an axle box 5. A seal member 6 is secured to the axially outer side of the outer race 2 on the inner diameter side of the axle box 5, and the inner peripheral lip portion of the seal member 6 is in sliding contact with an outer peripheral portion 131 formed on the outer peripheral side of the inner race 1, thus sealing the interior of the bearing. Reference numeral 7 designates a seal ring member mounted on the side of the axle box. An elastic seal provided on the outer peripheral side of the inner race 1 is in contact with the inner peripheral surface of the seal ring member. Reference numeral 134 denotes holes for inserting thereinto inner race fastening bolts 135 divided into two, and reference numeral 136 designates a natural dividing surface.

As a matter of course, the inner race 1, the outer race 2, the retainer 4, the axle box 5 and the seal ring 7 of the above-described assembly are of the two-division type, the seal member 6 is a one-point divided type oil seal cut at a point on the periphery thereof for the incorporation into the apparatus, and the elastic seal 9 is a cord-like ring with ends which seals the space between it and the seal ring 7 held in the axle box 5.

The inner race 1 leaves a compartment area of medium height centrally thereof and has spherical tracks 11 and 11 on the opposite sides thereof, and has outside the tracks 11 a flange portion 12 which is in contact with the end surfaces of said spherical rollers 3 and is formed with a cylindrical portion 13 extending axially outwardly in subsequence to the flange portion 12. A sliding cylindrical portion 131 having a predetermined width by which the seal member 6 is in sliding contact with the tracks 11 is left in the cylindrical portion 13, and slits 132 opposed to each other at diametrically symmetrical positions passing through the axis are formed outwardly of the sliding cylindrical portion 131. That is, the slits 132 are formed at two locations in one end surface of the cylindrical portion 13 and at two locations in the other end surface of the cylindrical portion 13.

Also, in the inner peripheral surface of the inner race 1, a slit 133 having its central area of medium height as the vertex and extending along the slits 132 and 132 is formed in discontinuous relationship with the slits 132. Designated by 141 and 142 are means for preventing jump-out of burrs during the cutting for forming the slits 132.

Figure 3:
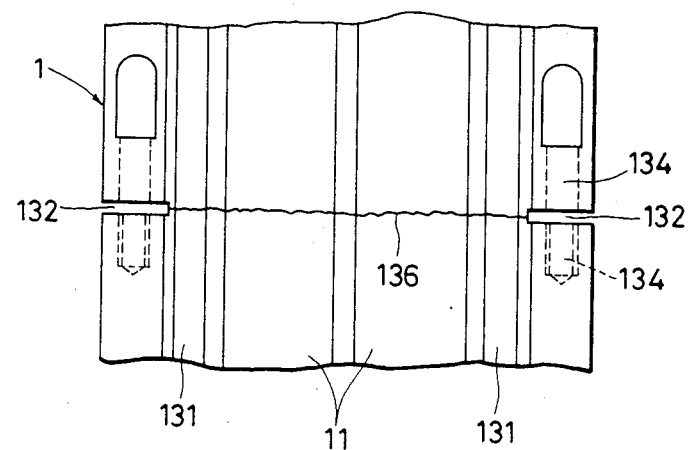
FIG. 3 is a developed view showing the joined portion of the inner race of the bearing shown in FIG. 2.

The thus formed inner race 1 is finished into desired dimensions and shape after quenching, whereafter it is radially pressed by applying a load onto the axis passing through the slits 132 and 132, and the solid portion thereof having no such slits is naturally divided to form two semicircular members, which are integrally coupled together through fastening bolts to form an inner race with the minute unevennesses of said naturally divided portions being made coincident with each other during assembly as shown in FIG. 3.

Particularly in the above-described embodiment, the slit 133 is provided in the inner peripheral surface and the thickness of the remaining portion (the solid portion) is made macroscopically substantially equal and therefore, a small force is only required during the division and at the same time, the deformation by the division can be minimized, but this slit 133 is not always required.

Figure 2:
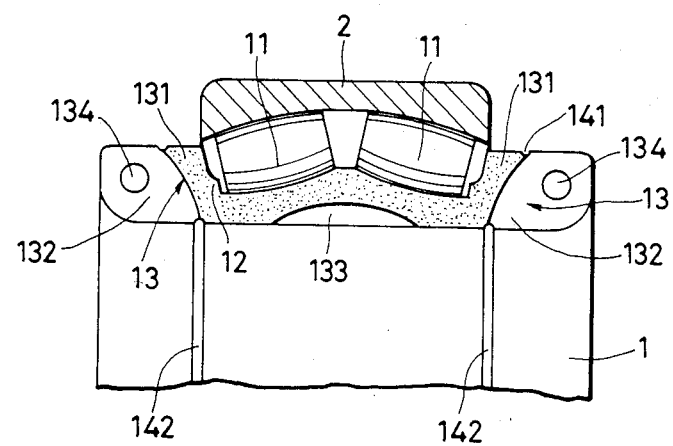
FIG. 2 is a cross-sectional view showing the bearing in FIG. 1.
Figure 4:
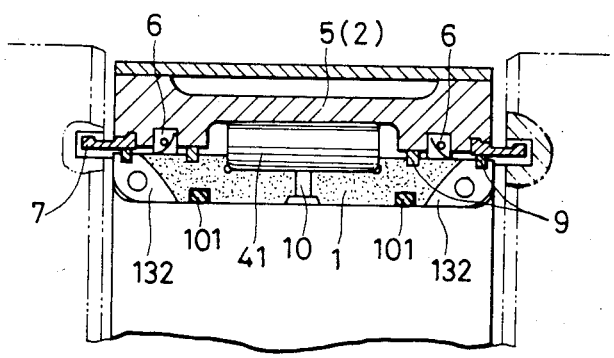
FIG. 4 is a view similar to FIG. 1 but showing a second embodiment of the present invention.

FIG. 4 shows a second embodiment in which portions common to the first embodiment shown in FIGS. 1 to 3 are given similar reference numerals. In this embodiment, a single row of cylindrical roller bearing assembly is used instead of the double-row spherical roller bearing assembly of the first embodiment, and of two outer race members divided into semicircular shapes, one member positioned above the non-load range side is omitted and the axle box 5 is made to perform also the function of said one member, and this embodiment does not basically differ from the first embodiment. In FIG. 4, reference numeral 101 designates O-rings for hermetically sealing the mating surface of the inner race because the inner race has an oil hole 10.

As described above, in the antifriction bearing assembly of the present invention, particularly the inner race thereof is naturally divided along the slits opposed to each other at symmetrical positions passing through the axis formed on the opposite end surfaces of the cylindrical portion and moreover, said slits are cut in leaving the sliding cylindrical surface with which is in sliding contact the seal member held toward the track by the housing of the outer race or the axle box and as a result, the portion with which the seal member is in sliding contact is naturally divided and after they are coupled together, the broken-away surfaces having minute unevenness are completely coincident with each other and are smoothly joined together without any gap or any deviation and therefore, the seal member in the joined portion is hardly abraded, and this antifriction bearing assembly can be made very compact in spite of its having a seal and effectively functions as the support bearing of the neck portion of a roll for continuous casting.

Of course, the structure of the bearing assembly, the type of the bearing used and the seal member are not restricted to the illustrated embodiments.

I claim:

1. A divided type antifriction bearing assembly with a seal member, having two semicircular divided inner annular members each having a track on the outer peripheral surface thereof and having at the axially outer end of said track a flange portion which is in contact with the surface of a roller, said inner annular members each forming a cylindrical shape having a cylindrical portion axially extending continuously to said flange portion, said inner annular members being divided along the axis thereof and coupled together, an outer annular member having a track on the inner peripheral surface thereof opposed to said inner annular members, and rollers provided between the tracks of said inner and outer annular members, characterized in that said bearing assembly includes a seal member mounted radially inwardly outside the track of said outer annular member, the inner peripheral portion of said seal member is in sliding contact with a portion of said cylindrical portion of each of said inner annular members, and said inner annular members have, at the opposite ends thereof leaving said cylindrical portions, slits opposed to each other at symmetrical positions passing through the axis and are naturally divided with said slits as the boundary.

2. A divided type antifriction bearing assembly according to claim 1, wherein said outer annular member comprises an outer race and an axle box supporting it.

3. A divided type antifriction bearing assembly according to claim 1, wherein an axle box forming a part of said assembly serves also as one member positioned in an upper portion which provides a non-load range side, of the inner race comprising two members divided into semicircular shapes.

* * * * *